United States Patent [19]

McFarlane

[11] 4,324,279

[45] * Apr. 13, 1982

[54] VEHICLE TIRE COMPRISING PNEUMATIC TIRE INSERTS

[76] Inventor: Richard B. McFarlane, 2400 Myrtle St., Bakersfield, Calif. 93301

[*] Notice: The portion of the term of this patent subsequent to Jun. 30, 1998, has been disclaimed.

[21] Appl. No.: 228,110

[22] Filed: Jan. 26, 1981

Related U.S. Application Data

[63] Continuation of Ser. No. 3,991, Jan. 16, 1979, Pat. No. 4,275,782, which is a continuation of Ser. No. 776,845, Mar. 24, 1977, abandoned.

[51] Int. Cl.³ ............................................. B60C 7/00
[52] U.S. Cl. ................................. 152/314; 138/125; 152/316; 152/320; 152/321; 152/322
[58] Field of Search ............... 192/310, 311, 312, 314, 192/316, 318, 319, 322, 324, 320, 321, 325, 327, 329, 339

[56] References Cited

U.S. PATENT DOCUMENTS

| | | | |
|---|---|---|---|
| 862,785 | 8/1907 | Andrew | 152/322 |
| 918,846 | 4/1909 | Gostlin et al. | 152/322 |
| 1,160,272 | 11/1915 | Frederickson | 152/320 |
| 1,335,115 | 3/1920 | Huffman | 152/322 |
| 1,390,467 | 9/1921 | Smith | 152/222 |
| 1,506,411 | 8/1924 | Cowgill | 152/320 |
| 1,819,632 | 8/1931 | Young | 152/322 |
| 1,825,520 | 9/1931 | Braga | 152/316 |
| 1,985,187 | 12/1934 | Miller | 152/316 |
| 4,127,166 | 11/1978 | Wyman | 152/312 X |
| 4,275,782 | 6/1981 | McFarlane | 152/316 X |

Primary Examiner—Edward C. Kimlin
Assistant Examiner—Thomas Bokan
Attorney, Agent, or Firm—Ralph B. Pastoriza

[57] ABSTRACT

A method and article of manufacture is herein disclosed for eliminating the need for pressurized air in a vehicular pneumatic tire. A resilient tubular insert is inserted and carried within a tire casing to simulate pneumatic conditions. The resilient material possesses a longitudinal bore which in combination with a particular range of durometers, enhances the "pneumatic" characteristics of the tire insert. Preferably, the tire insert is discontinuous and is designed to have a diameter greater than the internal diameter of the tire casing under deflated conditions.

40 Claims, 18 Drawing Figures

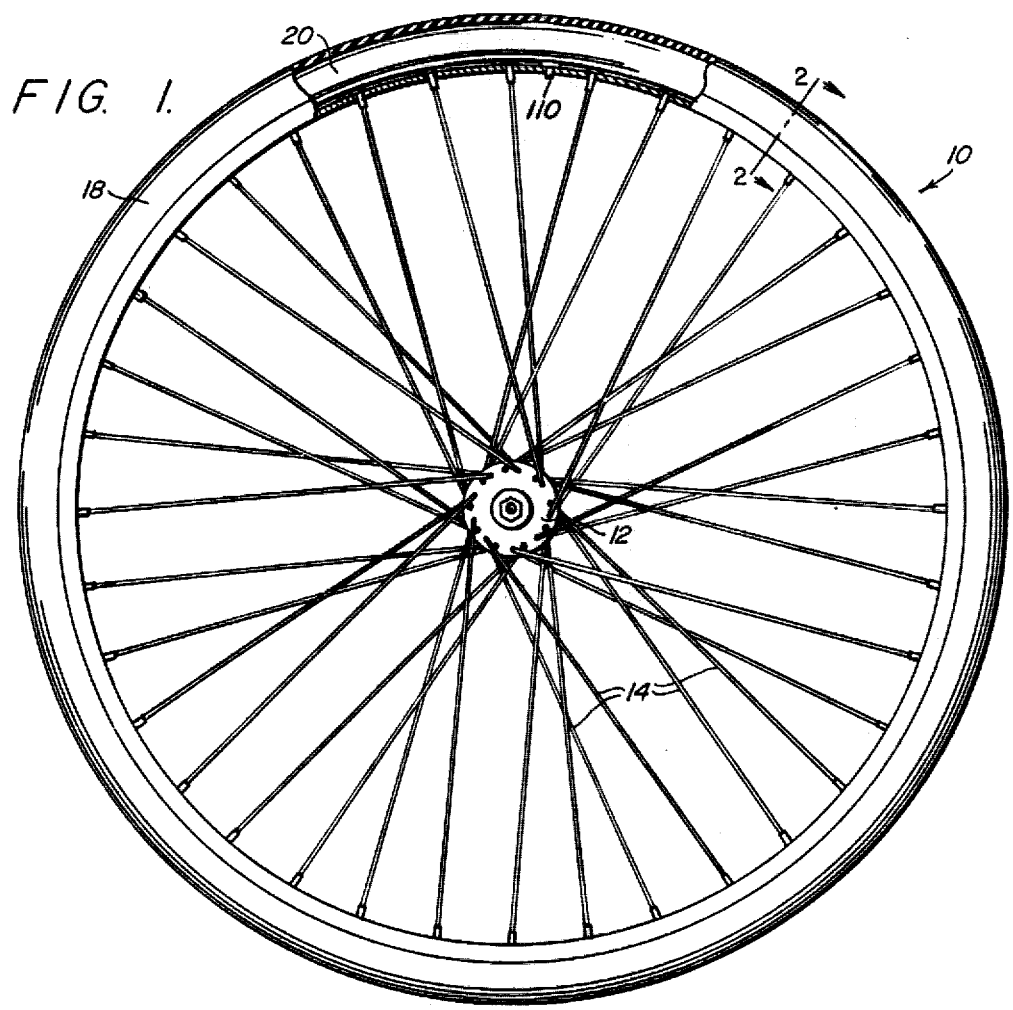
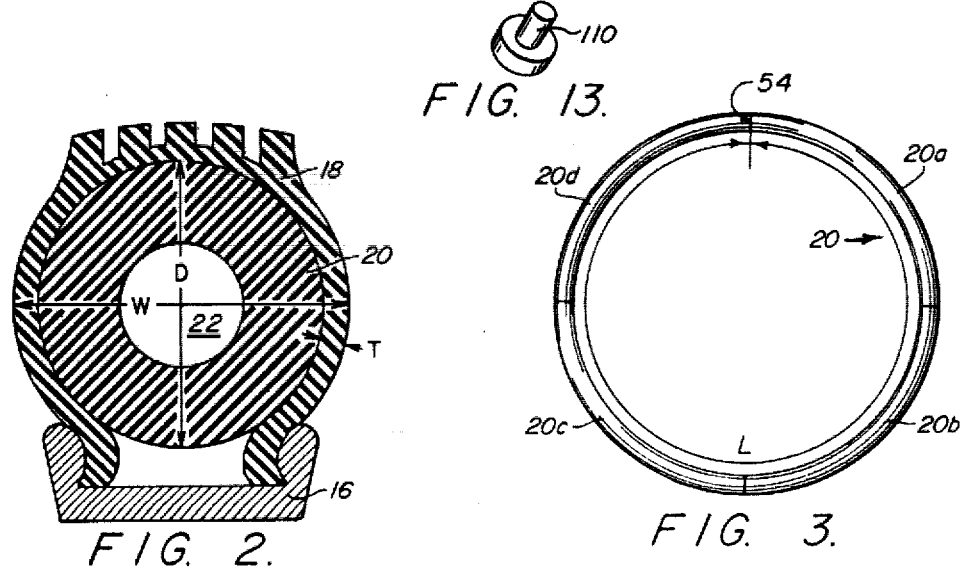

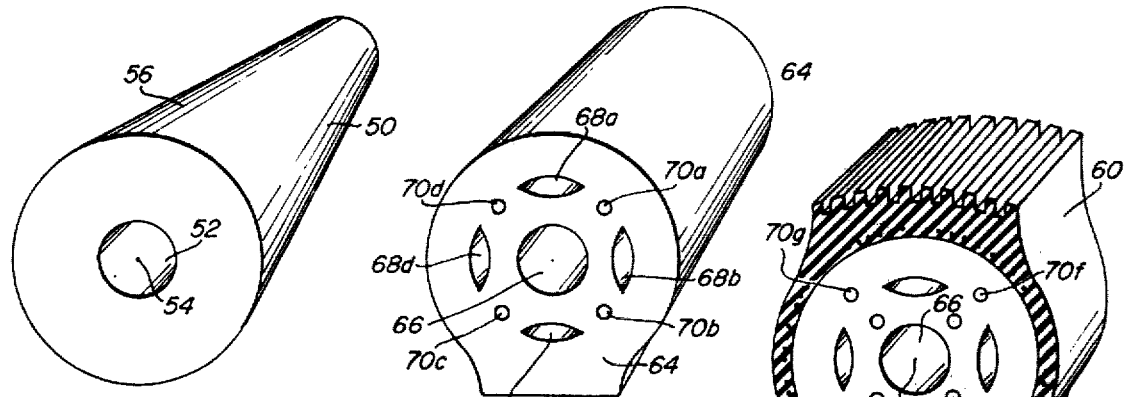
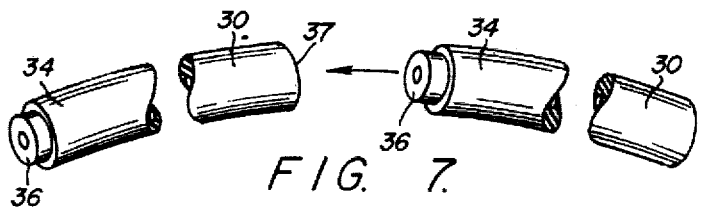
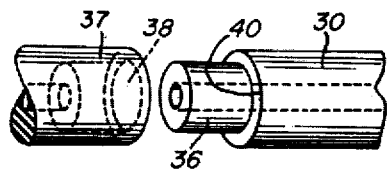 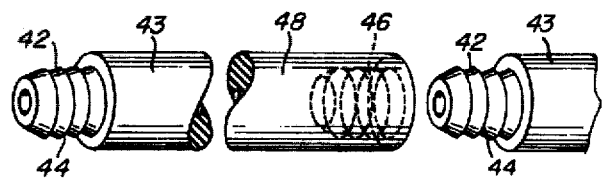
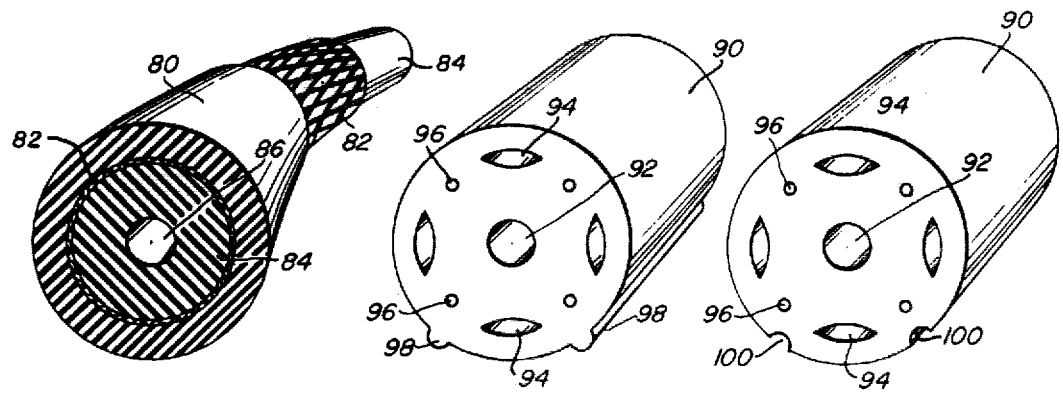

VEHICLE TIRE COMPRISING PNEUMATIC TIRE INSERTS

This application is a continuation of my copending application Ser. No. 003,991 filed Jan. 16, 1979 now U.S. Pat. No. 4,275,782 which in turn is a continuation of my originally-filed application Ser. No. 776,845 filed Mar. 14, 1977 now abandoned.

BACKGROUND OF THE INVENTION

This invention relates to vehicular tires and particularly to channeled inserts adapted for use in pneumatic tires as a replacement for pressurized air.

One of the major problems associated with pneumatic tires currently in use is that if the tire is punctured or pierced by a pointed object, the pressurized air contained therein will escape causing the tire to deflate. When this occurs, the tire has absolutely no utility until the puncture is sealed. This problem is well known to anyone who drives or owns a vehicle and is a particular problem to those who own and/or operate bicycles having high pressure pneumatic tires as are commonly found on the popular ten speed bicycles. Prior to this invention, many types of inserts and various methods and techniques have been suggested as a solution for these problems. One of these is the use of tire inserts. Examples of patents which disclose the use of tire inserts include the following U.S. Pat. Nos. 862,785; 918,846; 1,390,467; 1,819,632; and 1,506,411.

In each of the above patents, a means is disclosed whereby a rubber insert is placed within a tire casing to replace pressurized air. Each of the tubular inserts contains one or more cushioning chambers to simulate a pressurized pneumatic tire. One of the disadvantages of the inserts hereinbefore disclosed is that during use, the frictional movement of the inserts would generate heat and thereby cause deterioration of the tire casing's inner walls. Another problem is that there was no convenient means by which the prior art tire inserts could be constructed to insure a simulated pressure equivalent to the manufacturer's recommended pressure. In addition, many of the inserts disclosed in the prior art rely on the use of trapped ambient pressure to obtain a cushioning effect. In so doing, the tire can take on the characteristics of a partially flat or an improperly inflated tire when the trapped air is released by puncture.

A relatively recent innovation for preventing flat tires proposes a method for filling a pneumatic tire with a foamed rubber or plastic material and then curing the material within the tire. Upon completing the curing operation, the tire would be supported by the material introduced therein and would not not require pressurized air. The above technique requires special and costly equipment to adapt to conventionally used tires and would not thereby be readily available to the average consumer.

OBJECTS OF THE INVENTION

To overcome the above disadvantages, it is a primary object of this invention to provide a tire insert which can be readily and economically installed within conventional pneumatic tires.

Still another object of this invention is to provide a tire insert having a combination of properties which will simulate a preselected pneumatic pressure.

Another object of this invention is to provide a pneumatic tire which will retain its simulated pneumatic pressure or firmness even when pierced by sharp objects.

Still another object of this invention is to provide a tire casing which can support loads of up to three times its normal capacity.

Another object of this invention is to provide a tire insert which can be produced in one or more sections yet when placed within a tire casing will be the equivalent of a continuous tire insert.

SUMMARY OF THE INVENTION

These and other objects of this invention are achieved by a tire insert designed to be carried within a pneumatic tire casing mounted on a wheel rim, said tire insert comprising:

(a) a resilient annular member;

(b) having an internal annular bore means dimensioned such that said bore means defines an empty volume from 0.1444 to 0.3136 of the total volume of said member;

(c) said insert having a durometer hardness of between 30 and 65, as measured by a Type A Shore Durometer Tester, wherein (d) if L is the total length of the mean circumference of said annular member and C is the total length of the mean circumference of said pneumatic tire casing on said rim, L is larger than C prior to insertion of said insert in said pneumatic tire casing, by an amount between 0.005C and 0.013C and wherein (d) if D is the mean diameter of a cross-section of the resilient annular member, W is the width of the casing at normally inflated conditions, then $D = W = 2T$ whereby said insert is frictionally retained within said pneumatic tire casing against circumferential sliding movement relative to said tire casing when in use.

BRIEF DESCRIPTION OF THE DRAWINGS

In the drawings:

FIG. 1 shows a side elevation and cut-away of a conventional bicycle tire adopted with a tire insert of this invention.

FIG. 2 is a cross-section of the tire casing and insert taken along line 2—2 of FIG. 1.

FIG. 3 is a side elevation of a segmented tire insert.

FIG. 4 is a three-dimensional view of one of the segments used in a segmented tire insert.

FIG. 5 is a three-dimensional view of another embodiment of a segment of a segmented tire insert.

FIG. 6 is a three-dimensional view of a section of the segment shown in FIG. 5 when positioned within a tire casing.

FIG. 7 is another embodiment of a segmented tire insert having its ends adapted for connection with a correspondingly-mated second segment.

FIG. 8 is a phantom side view of the insert shown in FIG. 7.

FIG. 9 is a three-dimensional view of still another technique for connecting segmented tire inserts.

FIG. 10 is a sectioned three-dimensional view of a reinforced tire insert.

FIG. 11 and FIG. 12 are three-dimensional views of still other embodiments of a tire insert adapted with means for positioning and retaining the inserts within a tire casing.

FIG. 13 is a plug which can be inserted into the stem hole of a tire rim.

DESCRIPTION OF PREFERRED EMBODIMENT

Figure 14:
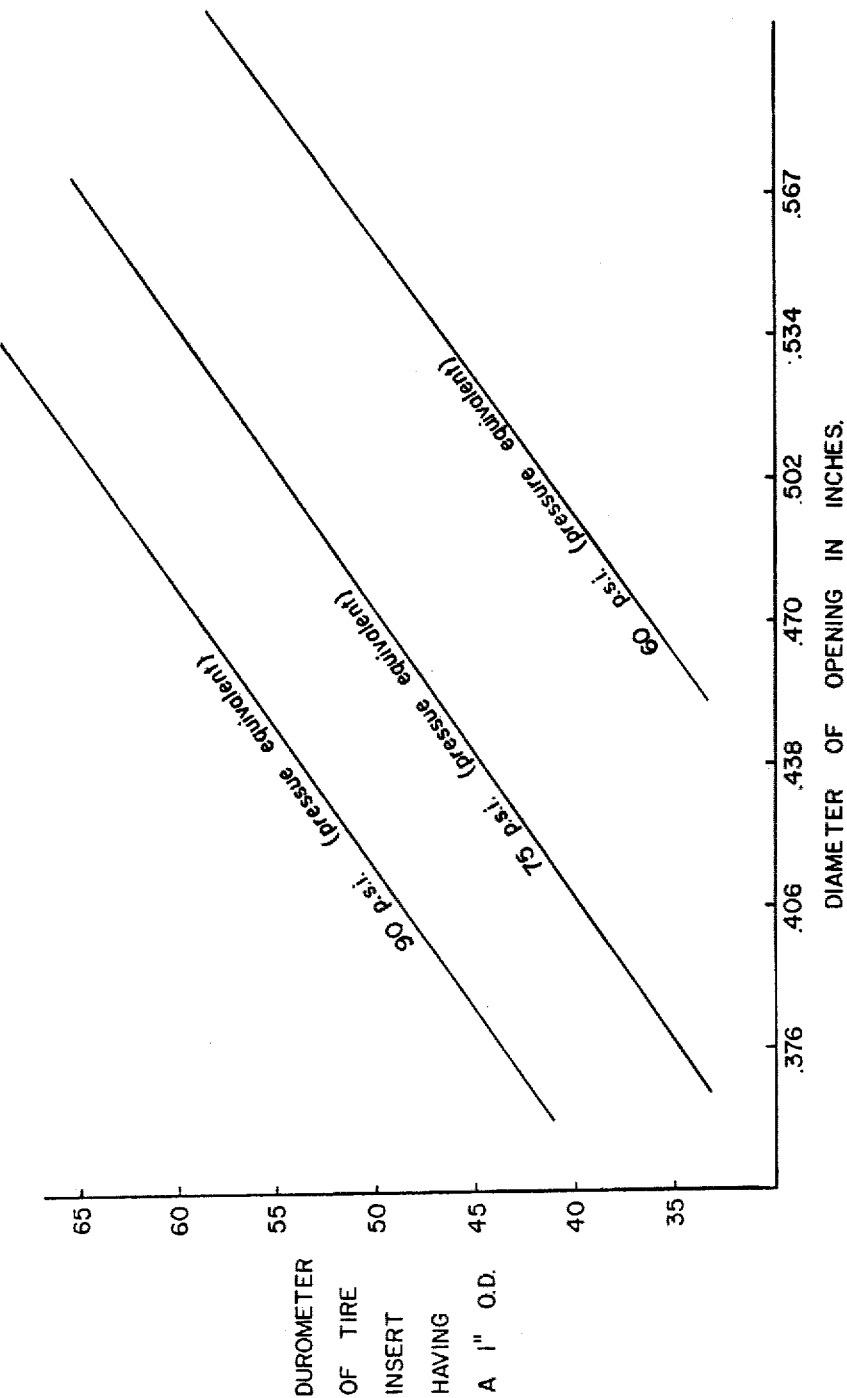
FIG. 14 is a graph showing the relationship between durometer, bore size and simulated tire pressure.

Referring to FIG. 1, a bicycle wheel, identified generally by the numeral 10 is shown. The bicycle wheel includes a central hub 12 from which connected spokes 14 emanate radially therefrom to the rim 16. Circumscribed about the rim is a conventional bicycle tire 18 containing a resilient tire insert 20. This embodiment is more clearly depicted in the cross-section shown in FIG. 2. As shown, the resilient tire insert contains a central annular bore 22. This central bore functions as a cushioning chamber, which in combination with certain physical characteristics of the material from which the insert is constructed, will produce a pneumatic pressure equivalency similar to or identical to that which would be realized if the tire was filled with pressurized air.

In FIG. 3, the tire insert 20 is segmented into four equal segments 20a, 20b, 20c and 20d respectively. Although the tire insert may be continuous, the use of three or more segmented sections have been found to posses certain advantages. For example, the manufacturing and packaging costs can be substantially reduced without sacrificing operational quality. FIGS. 7-9 inclusive show a particular technique for connecting segmented tire inserts if a pseudo-continuous tire insert is desired. In FIG. 7 the tire insert 30 contains a female end 37 and a male end 34. The male and 34 possesses a reduce diameter extending member 36 for fitting into an opening 38 (FIG. 8) bored in the female end 37. This relationship is shown in phantom in FIG. 8. In use, the male section 36 is inserted into the opening 38 until the ledge 40 of the male end abuts the rim of the female end 37. In FIG. 9 the male portion 42 of a segmented tire insert 43 is stepped 44 to fit into a correspondingly molded female or receiving end 46 (shown in phantom) of a second section of a segmented tire insert 48.

It has been found that if segmented tire inserts are utilized, it is preferred to have the mean length of the combined segments to be equivalent to the mean circumference of the tire casing under pressurized or expanded conditions. In other words, it has been found that the segmented tire inserts should possess a total segmented length slightly greater than the circumference of the tire casing when the tire casing is deflated or at rest. Still more preferably, the length should be equivalent to the length as determined by the following formula: $L = C + (a \cdot C)$ wherein L is the total mean length of the tire insert, C is the mean circumference of the tire casing and "a" is a decimal number between 0.005 and 0.013 and preferably between 0.007 and 0.011.

As shown in FIG. 4, a tire insert 50 is depicted with a central bore 52. The mean length would be calculated through point 54 if bent to form an arc of a circle. If extended, as shown in FIG. 4, the length through point 54 would be equivalent to the length along its side walls 56. The length L of the circumference through 54 is shown by the circular arrow designed L in FIG. 3. The mean circumference of the tire casing 60 would be the circumference of the tire casing shown in FIG. 6 as measured through its central point 62. This point will coincide with the central point of the tire insert 64 when the tire inwert is positioned within the tire casing 60.

FIG. 5 depicts a particular type of a tire insert which can be used in lieu of the circular tire insert shown in FIG. 4. As depicted in FIG. 5, the tire insert contains, in addition to the centrally bored opening 66, four symmetrically positioned eliptical openings 68a, 68b, 68c and 68d respectively, and four small bore openings 70a, 70b, 70c and 70d respectively. In the alternative, or in addition thereto, as shown in FIG. 6, four small bore openings 70e, 70f, 70g and 70h respectively may be included. These smaller bored openings and eliptically-shaped openings can be added if a more stable cushioning effect is desired under more stringent and adverse use conditions.

In FIG. 10, a more sophisticated tire insert is depicted wherein the tire insert 80 is reinforced by a webbed matrix 82 and a core 84 produced from a material having reinforcing properties.

In FIGS. 11 and 12, a tire insert 90 is shown having a centrally-bored opening 92, a series of eliptically-bored openings 94, and a series of smaller bored openings 96. In addition, a pair of curved ledges 98 are provided to insure correct positioning and alignment of the tire insert about a tire rim. In FIG. 12, the ledges are replaced by a pair of concave grooves 100 for grasping the outer edge of a tire rim (not shown). This arrangement insures positioning and replacement of the tire casing on the tire rim.

Figure 15:
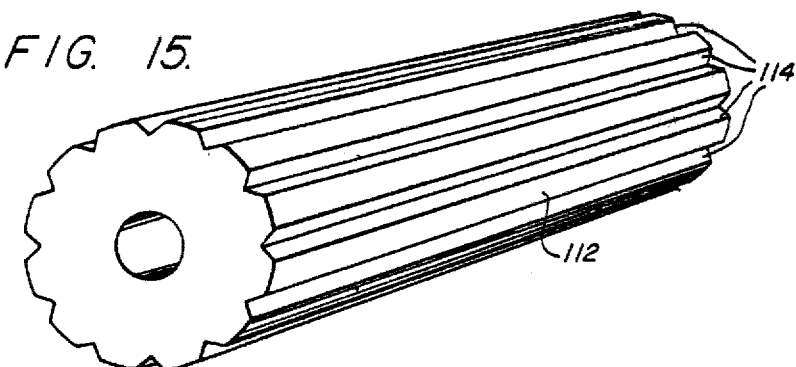
FIG. 15 is a three-dimensional view of a tire insert having longitudinal splines.
Figure 16:
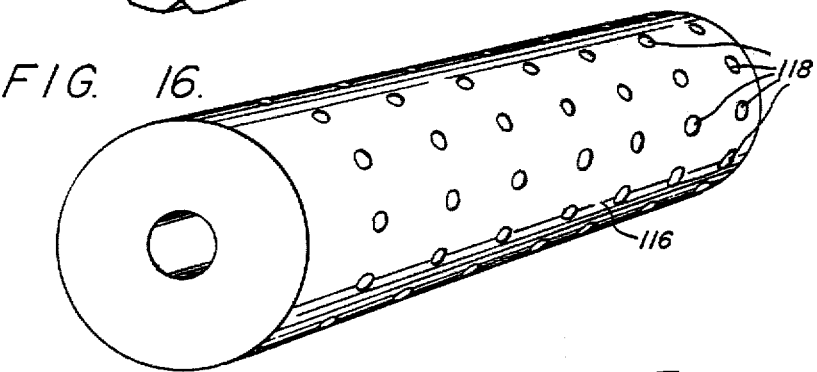
FIG. 16 is a three-dimensional view of a tire insert having radially bored openings.
Figure 17:
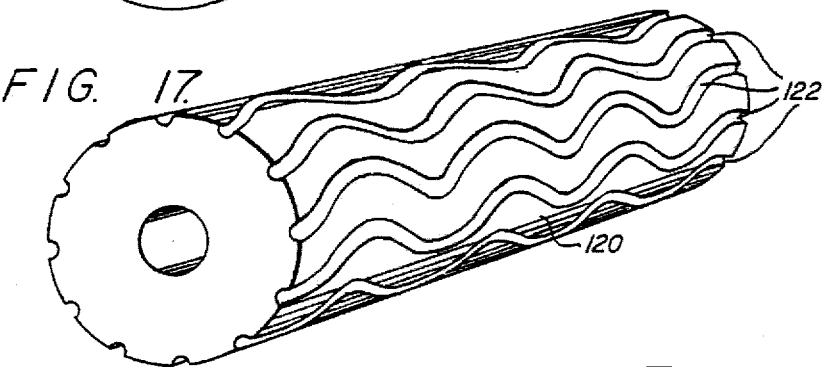
FIG. 17 is a three-dimensional view of a tire insert having wavy longitudinal grooves.

Although the tubular insert normally possesses a smooth, continuous outer surface as shown in FIGS. 3, 4 and 5, variations of the above may also be used to advantage. In FIGS. 15-17 inclusive, a number of variations are shown.

As shown in FIG. 15, the tubular insert 112 is adapted with a plurality of longitudinal splines 114 formed by cutting, molding or during extrusion of the tire insert.

The use of longitudinal splines, or variations thereof, as will be subsequently described in detail, permits the use of rubber or plastic materials having a higher durometer. As a general rule, a higher durometer will produce a tire having a higher pneumatic pressure equivalency. However, the use of higher durometer materials can be offset or neutralized by utilizing additional openings, cutting, grooves, etc., in the tire insert. The resultis a ride equivalent to that which could be obtained by using a lower durometer rubber but fewer open area.

Figure 18:
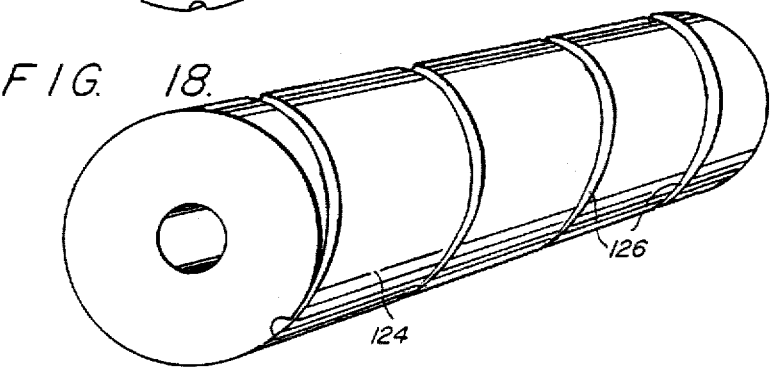
FIG. 18 is a three-dimensional view of a tire insert having spiralled grooves cut therein.

In FIG. 16, the tire insert 116 is adapted with openings provided by radial bores 118. In FIGS. 17 and 18, the additional openings in the tire insert 120 and 124 are represented by wavy longitudinal grooves 122 and spiraled grooves 126 respectively.

Combinations and variations of the above may also be used if desired. For example, the longitudinal grooves may be cut or bored into the internal walls of the bore longitudinal opening instead of the outer walls as depicted in FIG. 15.

One advantage associated with the above approach is that higher durometer materials may be used in constructing the tire inserts while at the same time, reducing costs of construction and costs of material as lesser amounts of high durometer material may be used to achieve essentially identical riding characteristics with that realized by the use of low durometer materials.

A critical feature of this invention is the use of a tire insert having a diameter equivalent to the diameter of the tire casing under normally inflated conditions. This critical diameter can be readily determined by the use of the following formula, $D=W-2T$ wherein D is the diameter of the tire insert, W is the width of the tire casing at normally inflated conditions and T is the thickness of the side walls of the tire casing under normally inflated conditions. These relationships are depicted in FIG. 2.

It has been found that if the tire insert is designed such that it does not exert a positive outward force against the inner walls of the tire casing, the tire insert will slidably move within the against the tire casing during use. This movement can generate frictional heat as well as produce an uneven and rough ride which, in combination, can incresse wear and deterioration of the tire casing.

It has also been found that certain physical properties of the rubber or polymeric material is critical if a simulated pneumatic condition is to be achieved. One of the most critical is the hardness of the material as measured by the Shore Durometer Testor. The most common type of testor used in the type A durometer which has an indentor point in the shape of a truncated cone having an 0.631 inch tip diameter and a 0.052 inch diameter at is shank. The indentor is tapered at an angle of 35° and has a spring-imposed load of two pounds. The specimen to be tested should be at least ¼ inch thick. The operator merely places the instrument against the rubber stock to be tested until the bearing plate (through which the indentor works) makes contact with the rubber stock. The hardness of the rubber stock is indicated by a pointer on a scale mechanically connected to the indentor.

As the hardness of the material is varied, the other physical properties of the resilient material will also normally change. For example, the maximum values for tensile strength, resilience, abrasion resistance, tear resistance, etc., occur in rubber or plastic stocks having a hardness in the range of 50-70 durometer.

The tire inserts of this invention may be constructed from a material having a durometer of between about 30 to 65 and preferably from a material having a durometer of between about 40 to 50. With materials having the above durometer, the volume of the opening or open space will be less than 0.33 or less than 33% of the total volume of the tire insert. With the above relationship, the tire insert will provide a pneumatic pressure equivalency in a bicycle tire of between about 60-90 pounds per square inch.

The materials which may be used to construct the tire insert of this invention include most all natural and synthetic rubbers and/or plastic-type polymeric materials having a durometer of between about 30 to 65.

Examples of such materials include the following crude and reclaimed natrual and synthetic rubbers: butyl rubber, cyclized rubbers, GRS type (Butadiene-Styrene) rubbers, methyl rubber, neoprene, Nitril rubber (copolymer of butadiene and acrylonitrile), neoprene (soybean rubber), polybutenes, polyester-type rubbers, polyethylene, silicone rubbers, sulfide rubbers, vinyl plastic, polyvinyl chloride, vinyl chloride copolymers, polyvinyl alcohol and the like.

The tire inserts may be formed by extruding the above types of materials into extended lengths and then cutting same to the desired segmented lengths.

Various types of extruded tubing is commercially available having a wall thickness from 1/32 of an inch to 3/16 of an inch and having an internal diameter of from between 1/32 to 1 inch. Extruded products having an outside diameter of up to 2 inches are also readily available. Larger diameter tubing can generally be obtained on special order.

Where conventional pneumatic tires are used to provide the tire casing for receiving the tire inserts, caps can be used to fit into the stem opening in the tire rim to prevent water and other contaminants from entering therein and thereby cause increased deterioration of the tire insert and casing. A plug 110 typical of those which can be used is shown in FIG. 13.

The relationship between bore diameters, insert length and diameters, material durometer and pneumatic pressure equivalencies have been determined. As indicated in Table I below, various simulated tire pressures can be achieved by varying the outer diameter, bore diameter and durometer of the tire insert.

TABLE I

| Equivalent PSI | Insert Length (Inches) | (Inches) Insert Diameter | Insert Bore Diameter (Inches) | Shore A Durometer |
|---|---|---|---|---|
| 75 | 82 | 1.0 | ⅜ | 35/40 |
| 85 | 82 | 1-1/16 | ⅜ | 45/50 |
| 15 | 82 | 1.0 | ⅜ | 35/40 |
| 35 | 82 | 1-1/16 | ⅜ | 45/50 |
| 75 | 82 | 1-1/16 | ½ | 45/50 |

It has also been found that, when the tire insert of this invention is to possess a pressure equivalency of about 75 PSI (pressure normally used with ten speed bicycle tires) there is an approximate 1:1 ratio between the durometer and the internal bore of the tire insert. This relationship is particularly meaningful when the tire insert has a one inch outer diameter. This relationship is shown in Table II below and is depicted graphically in FIG. 14 of the drawings.

TABLE II

| Equivalent PSI | Durometer of Tire Insert having 1" Outer Diameter | Bore Size In Inches | Ratio of Durometer to Bore Size |
|---|---|---|---|
| 75 | 35 | 0.38 | 0.936 |
| 75 | 40 | 0.41 | 0.985 |
| 75 | 45 | 0.44 | 1.030 |
| 75 | 50 | 0.47 | 1.050 |
| 75 | 55 | 0.50 | 1.100 |
| 75 | 60 | 0.53 | 1.130 |
| 75 | 65 | 0.56 | 1.160 |

As a general rule, it has been found that for each increase in durometer of +5, the bore size, of a one inch O.D. tubular insert, may be increased by 1/32 of an inch or approximately 0.032 inch. The above relationship is valid for durometers of between about 35 and 65.

Since the ratio of the bore cross-sectional area to the total cross-sectional area indicates the fraction of the empty volume to the total volume, for bore sizes ranging from 0.38 inches to 0.56 inches of the outside diameter of one inch as in the above table, the ratio of empty volume to total volume of the inserts may vary from 0.1444 to 0.3136.

Where a plurality of bores is used in the tire insert, as opposed to a single annular bore, the above relationship will remain true if a cumulative bore size of the openings is used. Where the bore in the tire insert is eliptically shaped, an average diameter can be used. The eliptically-shaped openings in combination with a central bore seem to provide a more constant cushioning effect and more closely approximates the ride that could be realized with air in the pneumatic casing particularly under more stringent and adverse use conditions.

As the outer diameter of the tire insert is increased, the bore size can likewise be increased at a constant diameter and a PSI equivalency can be thereby empirically established or calculated. With the tire insert of this invention, the need for inner tubes or air is avoided. As expressed earlier, the tire insert is constructed from an elastic or flexible material having resilient properties. Generally, the insert is circular in shape. However, a "key hole" shape may be used to accommodate larger vehicles such as cars, trucks, airplanes, and the like. The circular tire insert is especially well adapted for use on bicycles or vehicles which would be subjected to less than 1,000 pounds total weight.

The tire insert may be continuous or one piece with the ends sealed, vulcanized, glued, or otherwise secured or it may be segmented or discontinuous. Where the insert is segmented the total diameter or mean length of the insert is greater than the tire casing at rest. This arrangement, as pointed out above, permits the insert to be continuously urged outwardly against the inner walls of the tire casing. This avoids the insert from sliding about within the casing during use. Although the tire inserts are generally constructed from non-reinforced materials, reinforcing materials such as fibres, cords, metals and the like may be used, if desired. When reinforced materials are used, a reduction in tire insert resiliency occurs making its use similar to over-inflated pneumatic tires.

While this invention has been described with reference to certain specific embodiments, it should be understood that changes may be made by one skilled in the art but such changes would not depart from the spirit and scope of this invention which is limited only by the claims appended hereto.

I claim:
1. In combination:
   (a) a wheel rim;
   (b) a pneumatic tire casing mounted on said wheel rim; and
   (c) a tire insert, said tire insert comprising a resilient annular member having an internal annular bore means dimensioned such that said bore means defines an empty volume from 0.1444 to 0.3136 of the total volume of said member, said insert having a durometer hardness of between 30 to 65 as measured by a type A Shore durometer testor, wherein if L is the total length of the mean circumference of said annular member and C is the total length of the mean circumference of said pneumatic tire casing on said rim, L is larger than C prior to insertion of said insert in said pneumatic tire casing by an amount between 0.005C and 0.013C and wherein if D is the mean diameter of a cross section of the resilient annular member, W the width and T the wall thickness of the tire casing under normally inflated conditions, then $D = W - 2T$ whereby said insert is frictionally retained within said pneumatic tire casing against circumferential sliding movement relative to said tire casing when in use.

2. The combination of claim 1, in which said resilient annular member is segmented with means formed at the ends of the segments for securing them in their annular configuration.

3. The combination according to claim 2, wherein said means are male and female type connecting means respectively.

4. The combination of claim 3, wherein said male type connecting means comprises a reduced diameter extending member and the female connecting means includes an opening bored in the end of a segment such that the reduced diameter extending member can be inserted into the opening.

5. The combination of claim 3 in which the male connecting means constitutes a stepped member and the female connecting means includes a correspondingly molded receiving end for receiving said stepped member.

6. The combination of claim 2 in which said means constitutes sealing the ends together.

7. The combination of claim 2 in which said means constitutes vulcanizing the ends together.

8. The combination of claim 2 in which said means constitutes gluing said ends together.

9. The combination of claim 1 in which the tire insert is adapted with longitudinal splines.

10. The combination of claim 1 in which said tire insert is adapted with radial bores.

11. The combination of claim 1 including a closure means for closing the stem opening normally found on said wheel rim.

12. The combination of claim 11, in which said closure means comprises a plug.

13. The combination of claim 1 in which said bore means includes a central bore and symmetrically positioned eliptical openings and small bore openings about the bore to provide a more stable cushioning effect under certain adverse conditions.

14. The combination of claim 1 in which said tire insert is reinforced by a webbed matrix.

15. The combination of claim 1 in which said tire insert includes a pair of curved ledges to insure correct positioning and alignment of the tire insert about said wheel rim.

16. The combination of claim 1 in which said tire insert includes a pair of concave grooves positioned to engage the outer edge of said tire rim.

17. The combination of claim 1 in which said tire insert has a key-hole shape in cross section.

18. The combination of claim 1 in which said tire insert is of circular cross section.

19. The combination of claim 1, in which said wheel rim, pneumatic tire casing and tire insert are used on cars.

20. The combination of claim 1 in which said wheel rim, tire casing and tire insert are used on trucks.

21. The combination of claim 1, in which said wheel rim, tire casing and insert are used on airplanes.

22. The combination of claim 1, in which said wheel rim, tire casing and insert are used on bicycles.

23. The combination of claim 1, in which said wheel rim, tire casing and insert are used on vehicles which weigh less than 1,000 pounds.

24. The combination of claim 1, in which the material of said tire insert comprises natural rubber.

25. The combination of claim 1, in which the material of said tire insert comprises butyl rubber.

26. The combination of claim 1, in which the material of said insert comprises cyclized rubber.

27. The combination of claim 1, in which the material of said insert comprises butadiene-styrene rubber.

28. The combination of claim 1, in which the material of said insert comprises methyl rubber.

29. The combination of claim 1, in which the material of said insert comprises neoprene.

30. The combination of claim 1, in which the material of said insert comprises nitril rubber.

31. The combination of claim 1, in which the material of said insert comprises soybean rubber.

32. The combination of claim 1, in which the material of said insert comprises polybutene.

33. The combination of claim 1, in which the material of said insert comprises polyester-type rubber.

34. The combination of claim 1, in which the material of said insert comprises polyethylene.

35. The combination of claim 1, in which the material of said insert comprises silicone rubber.

36. The combination of claim 1, in which the material of said insert comprises sulfide rubber.

37. The combination of claim 1, in which the material of said insert comprises vinyl plastic.

38. The combination of claim 1, in which the material of said insert comprises polyvinyl chloride.

39. The combination of claim 1, in which the material of said insert comprises vinyl chloride copolymers.

40. The combination of claim 1, in which the material of said insert comprises polyvinyl alcohol.

* * * * *